UNITED STATES PATENT OFFICE.

CHARLES F. GRIMM, OF LE ROY, MINNESOTA.

SOLDER.

1,093,403.

Specification of Letters Patent. Patented Apr. 14, 1914.

No Drawing. Application filed April 18, 1913. Serial No. 762,013.

*To all whom it may concern:*

Be it known that I, CHARLES F. GRIMM, a citizen of the United States, residing at Le Roy, in the county of Mower and State of Minnesota, have invented certain new and useful Improvements in Solder; and I do declare the following to be a full, clear, and exact description of the invention, such as will enable others skilled in the art to which it appertains to make and use the same.

This invention relates to a solder which is especially adapted for soldering aluminum.

The object of the invention is to provide a cheaply constructed solder which will not come off after once being applied and will form a tight waterproof joint.

Another object of the invention is to provide a solder which can be applied to the aluminum while the aluminum is cold and which is designed for connecting or soldering aluminum to other metals such as tin, copper, brass and the like, or such metals to each other.

This improved solder is composed of zinc, tin and lead preferably combined in the following proportions, to wit: 25% zinc, 50% tin, 25% lead. These ingredients in the proportions above specified are placed in a ladle or pot and the entire mixture heated to a red heat at which point the alloys will completely fuse. The melted mass is then poured into a mold or molds of the desired size to form sticks of solder and it is allowed to cool in said molds. The aluminum to be soldered is placed in the desired position, the surface thereof to which the solder is to be applied having first been cleaned if necessary. An ordinary soldering iron is then heated and some of this solder is placed in contact therewith and at once melts and follows the joint or hole which is to be soldered and this solder it has been found will not crack or check and produces a solid tight joint.

While the proportions specified above have been found to produce a satisfactory solder yet it is not desired to limit the invention thereto as experiment has determined that the ingredients may be combined in other proportions and operate equally well. For instance, seven parts of tin, two parts of zinc and one part of lead may be combined and form a very satisfactory, efficient solder, also eight parts of tin, two parts of lead and two parts of zinc it has been found will solder tin, copper, brass, aluminum and will solder either of these metals together and will also act when a flux or acid is employed upon the metals except upon aluminum which should have no acid or flux used in connection therewith because of corrosion.

The use of lead in solder renders it strong and causes it to hold the heat and thus adapts it for use with a soldering iron alone without heating either the solder or the article to which it is to be applied. It has also been found that a solder consisting of tin, zinc and lead will attack each other almost equally when a well heated soldering iron is placed simultaneously in contact with each of the metals to be soldered. The lead in the solder holds the heat and retains the tin and zinc in an adhesive condition when applied upon aluminum while zinc and tin alone will set hard at once and have less effect upon the resisting surface of the aluminum. A tin and zinc solder is brittle and will not stand bending and cannot be employed with a soldering iron alone as it hardens the moment it touches the aluminum and this necessitates the heating of the aluminum.

I claim as my invention:

A solder composed of zinc twenty-five per cent., tin fifty per cent., and lead twenty-five per cent.

In testimony whereof I have hereunto set my hand in presence of two subscribing witnesses.

CHARLES F. GRIMM.

Witnesses:
 H. G. CLAPPER,
 MERRILL BOWERS.